INVENTOR
Delmer S. Fahrney
BY
Ransom K. Davis
ATTORNEY

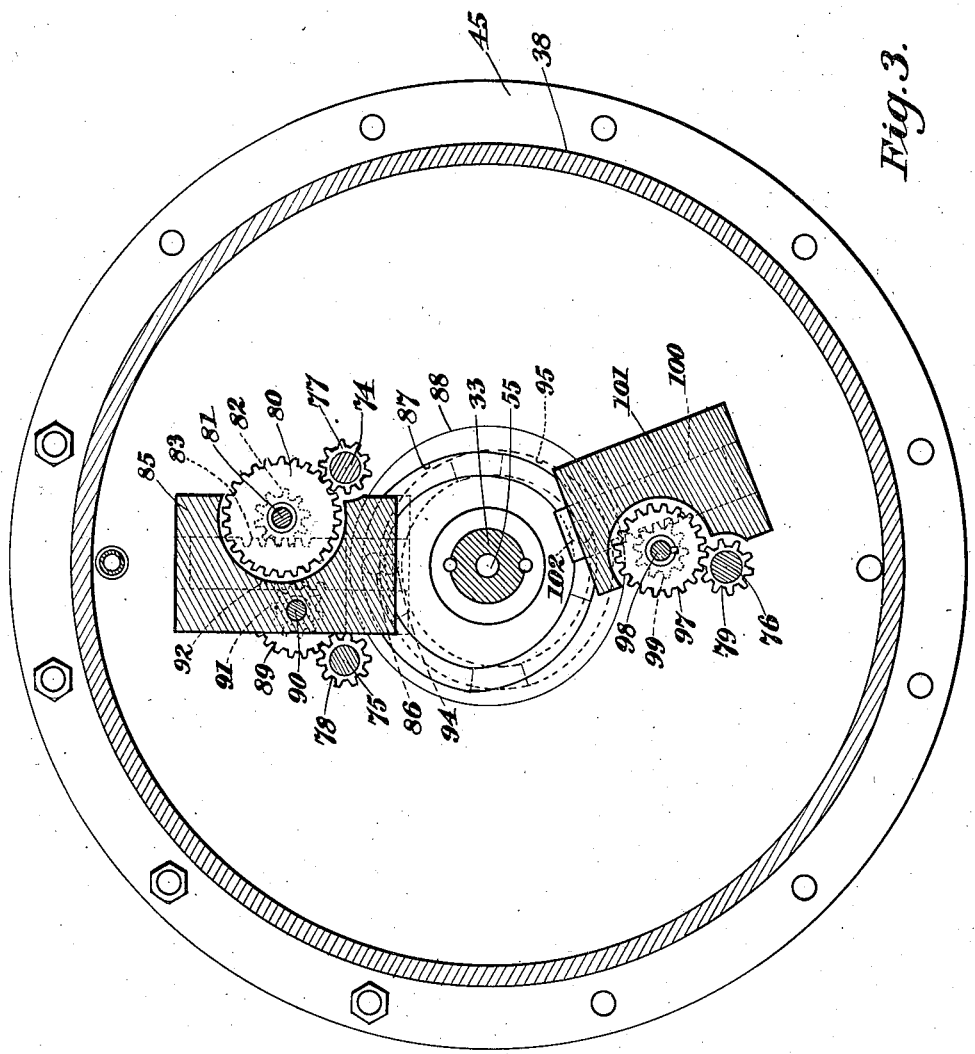

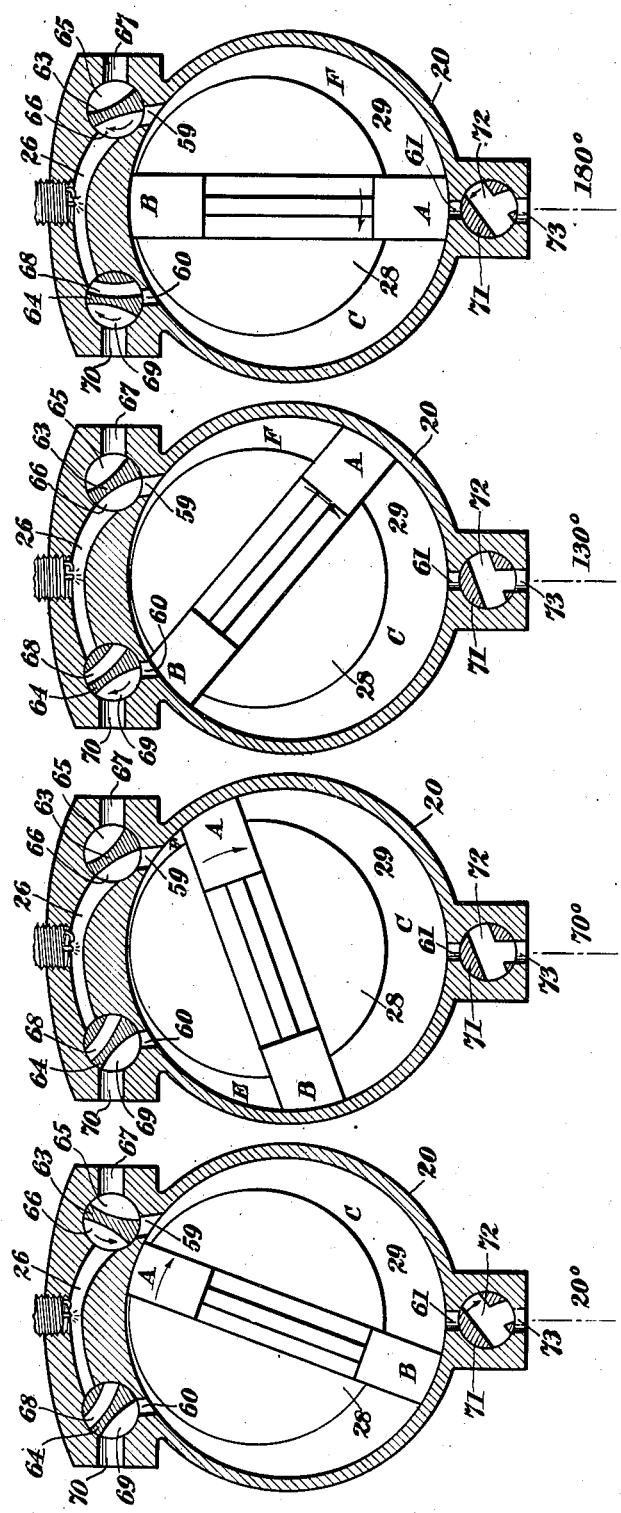

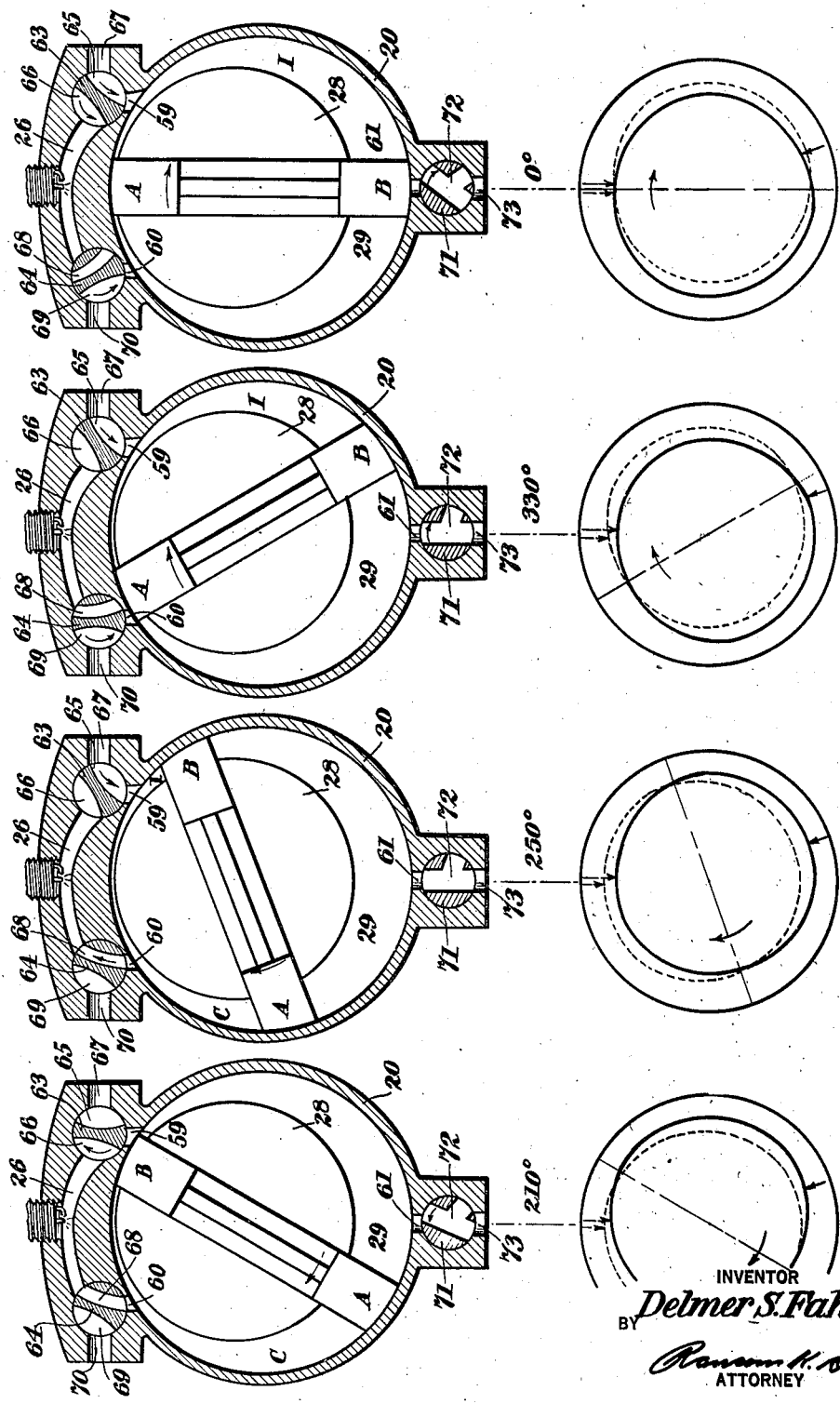

Patented Nov. 21, 1939

2,180,352

UNITED STATES PATENT OFFICE 2,180,352

ROTARY INTERNAL COMBUSTION ENGINE

Delmer S. Fahrney, United States Navy

Application March 9, 1938, Serial No. 194,883

3 Claims. (Cl. 123—16)

(Granted under the act of March 3, 1883, as amended April 30, 1928; 370 O. G. 757)

This invention relates to internal combustion engines and it has a particular relation to engines of the rotary type embodying a member rotatably mounted in a cylindrical casing and provided with a plurality of sliding piston-vanes cooperating with the cylindrical surface of the casing for successively drawing in the combustible mixture, compressing the same, receiving the propelling force of the combustion of the explosive mixture and for finally expelling the burnt gases from the combustion chamber.

The principal object of the present invention is the provision of an engine, of the character described, which is of improved construction and increased efficiency and in which the number of moving parts is materially reduced.

More specifically, the invention contemplates the provision of a rotary internal combustion engine in which each of the several piston-vanes is driven by the firing of a charge of combustible mixture behind the vane which previously compressed such charge and upon the succeeding revolution thereof, and also in which the area of the surface of the vane acted upon by the expanding gases increases as the force of said gases decreases, the combustion chamber being provided with a high pressure exhaust port located at a point of maximum cross sectional area to decrease the load imposed upon the succeeding vane in expelling the burnt gases from the firing chamber through the low pressure exhaust port located where the area of the firing chamber is the smallest.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 3 is similar view taken on line 3—3 of Fig. 1; and

Figure 1:
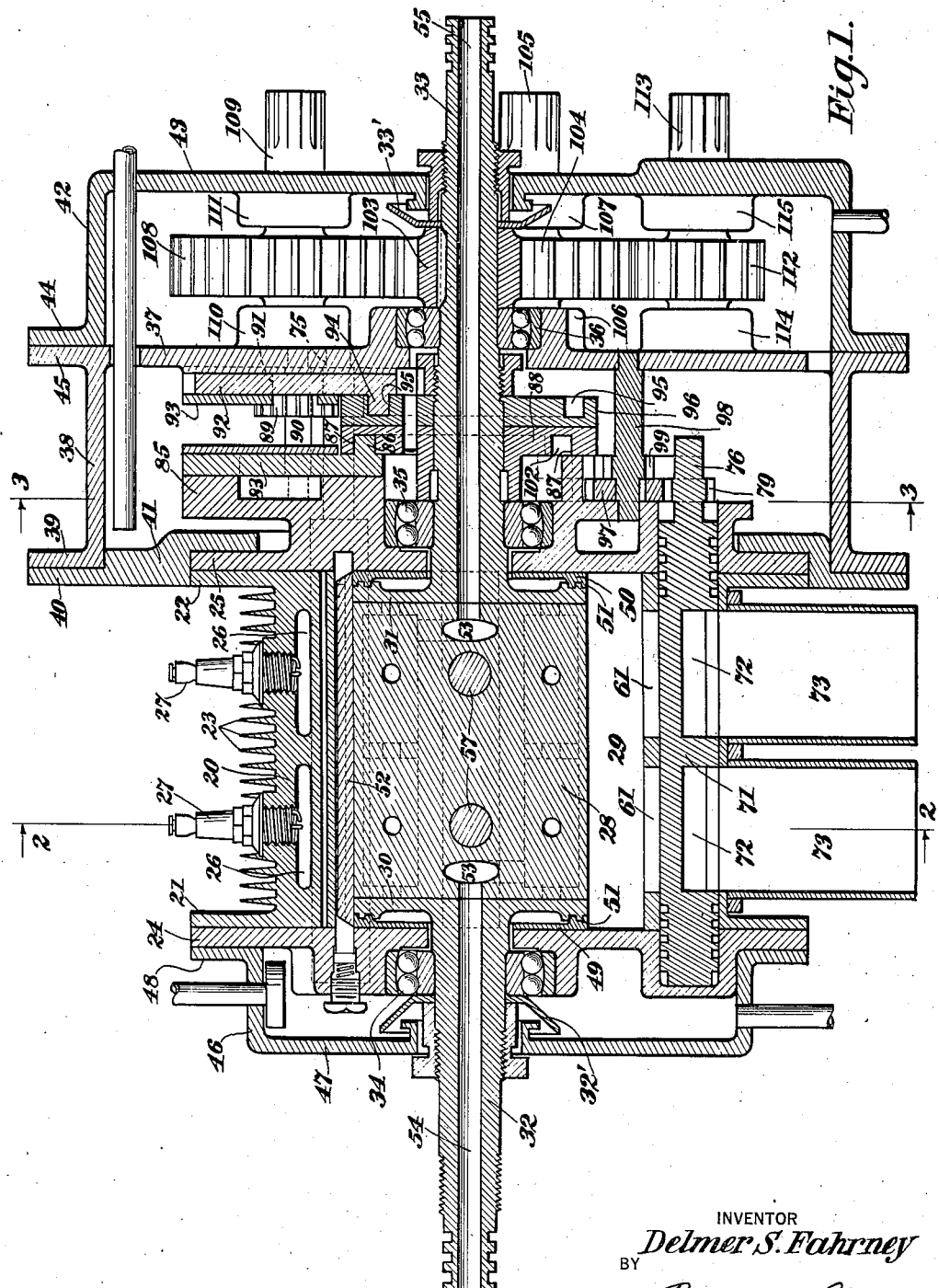
Fig. 1 is a vertical longitudinal sectional view through a rotary internal combustion engine constructed in accordance with the invention.
Figure 2:
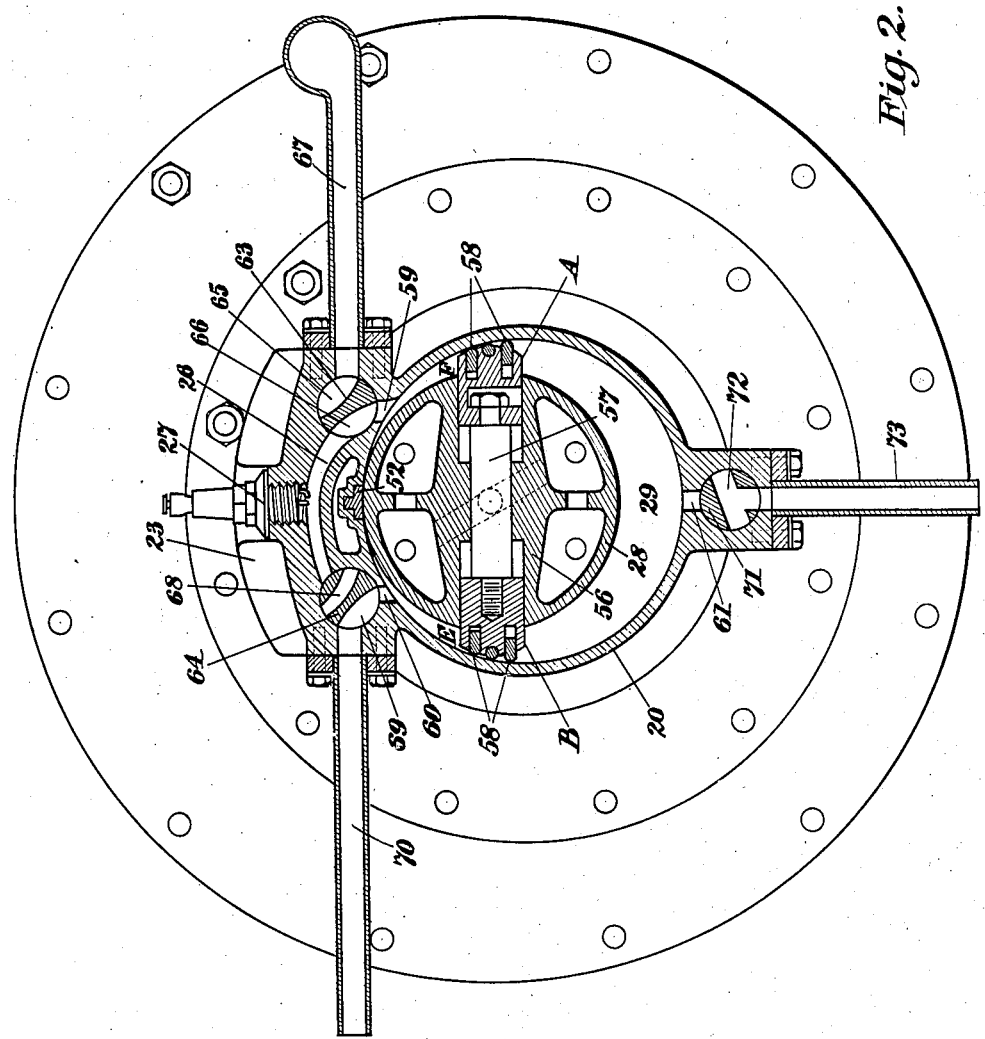
Fig. 2 is a vertical transverse sectional view taken on line 2—2 of Fig. 1.

Figs. 4 to 11 inclusive, are vertical diagrammatical sectional views illustrating the intake, compression, firing and exhaust phases of the cycle of operations of the engine, and the relative positions of the valve operating cams.

Referring to the drawings, a rotary engine embodying the present invention is shown as comprising a cylindrical casing 20 formed at its ends with circumferential flanges 21 and 22 and with a plurality of intermediate cooling fins 23. The casing 20 is closed at its ends by head members 24 and 25 which are secured to the flanges 21 and 22 respectively and is further formed with a pair of communicating firing chambers 26 in which a combustible charge is adapted to be fired simultaneously by spark plugs 27. A cylindrical rotor 28 is excentrically mounted within the casing 20 in contiguous relation to the upper portion thereof to form a compression-combustion chamber 29 in the lower portion of the casing which decreases in cross sectional area upwardly on opposite sides of the rotor toward the line of tangency between the rotor and the casing. This rotor is fixed between discoidal flanges 30 and 31 formed on the inner ends of two shafts 32 and 33, the former being journalled in a bearing 34 mounted in the head member 24, and the latter being journalled in a bearing 35 mounted in the head member 25 and also in a bearing 36 mounted in the end wall 37 of a cylindrical cam housing 38. The housing 38 is formed with a circumferential flange 39 which is secured to a flange 40 on an annular plate 41 which is in turn secured to the head member 25. A gear housing 42 is located adjacent to the cam housing 38 and is formed with a wall 43 through which the shaft 33 extends and a flange 44 which is secured to a flange 45 also provided on the cam housing 38. The other end of the casing 20 is provided with a housing 46 which encloses the bearing 34 and is formed with a wall 47 through which the shaft 32 extends and with a flange 48 which is secured to the end member 24. Oil deflecting members 32' and 33' are mounted on the shafts 32 and 33 to prevent the leakage of oil from the housings 42 and 46 where these shafts pass through the end walls 43 and 47 thereof. Sealing disks 49 and 50 are interposed between the flange 30 and the end member 24 and between the flange 31 and the end member 25 and are preferably formed with concentric ribs and grooves 51 for interengagement with corresponding ribs and grooves on the adjacent flange. A longitudinally extending sealing bar 52 is seated in the casing 20 for sealing contact with the upper side of the rotor 28.

The rotor 28 is of hollow construction and communicates through passages 53 with bores 54 and 55 provided in the shafts 32 and 33 through which a cooling medium is adapted to be circulated. The rotor 28 is also formed with bearings 56 in which opposed piston vanes A and B are slidably mounted for frictional engagement with the inner cylindrical surface of the casing 20. These piston-vanes are connected by rods 57 for movement in unison and are provided with longitudinally extending sealing bars 58 for frictional contact with the wall of the casing.

The casing 20 is formed with a fuel inlet port 59 and a low pressure exhaust port 60, said ports being located in the upper portion of the casing 20 on opposite sides of the line of tangency between the rotor 28 and the casing. A high pressure exhaust port 61 is also formed in the casing 28 between the ports 59 and 60 at a point where the cross sectional area of the chamber 29 is the greatest.

Valve members 63 and 64 are mounted for rocking movement in the upper portion of the casing 20 on opposite sides of the line of tangency of the rotor 28 and the casing. The valve member 63 is provided with ports 65 and 66, the former, during the intake phase, establishing communication, through the inlet port 59, between the chamber 29 and an inlet manifold 67 and the latter, during the combustion phase, establishing communication between the chamber 29 and the firing chambers 26. The valve 64 is also provided with ports 68 and 69, the port 68, during the compression phase, establishing communication through the outlet port 60, between the chamber 29 and the firing chambers 26 and the port 69 during the latter part of the scavenging phase, establishing communication between the chamber 29 and an exhaust pipe 70. A high pressure exhaust valve 71 is mounted for rocking movement in the lower portion of the casing 20 midway between the valves 63 and 64 and is provided with a port or passage 72 for establishing communication through the port 61 between the chamber 29 and an exhaust pipe 73 during the first part of the scavenging phase.

The valves 63, 64 and 71 are rocked in timed relation relative to one another and relative to the rotation of the rotor 28 and piston-vanes A and B carried thereby, by means of the following described mechanism. The right hand ends (Fig. 1) of these valves are formed with stud shafts 74, 75 and 76 which extend through the end member 25 and carry pinions 77, 78 and 79 respectively. The pinion 77, which is fixed to the shaft 74 of the intake valve member 63, meshes with a gear 80 of larger diameter, which is fixed to a shaft 81 journalled in bearings carried by the head member 25 and the wall 37 of the housing 38. A pinion 82 is also fixed to the shaft 81 for intermeshing engagement by a rack bar 83 which is mounted for vertical sliding movement in guides 85 also carried by the head member 25. The lower end of the rack bar 84 is provided with a roller 86 for engagement with a cam groove 87 formed in the face of a disk 88 fixed to the shaft 33 of the rotor 28. In a like manner, the pinion 78, which is fixed to the shaft 75 of the low pressure exhaust valve member 64, meshes with a gear 89 which is fixed to a shaft 90 journalled in bearings also carried by the head member 25 and wall 37. A pinion 91 is also fixed to the shaft 90 for intermeshing engagement with a rack bar 92 mounted for vertical sliding movement in guides 93 carried by the wall 37 of the housing 38. The lower end of the rack bar 92 is provided with a roller 94 for engagement with a cam groove 95 formed in the face of a disk 96 which is also fixed to the shaft 33. Also, the pinion 79, which is fixed to the shaft 76 of the high pressure exhaust valve member 71, meshes with a gear 97 which is fixed to a shaft 98 journalled in bearings carried by the head member 25 and the wall 37. A pinion 99 is also fixed to the shaft 98 for intermeshing engagement with a rack bar 100 mounted for sliding movement in guides 101 carried by the head member 25. The upper end of the rack bar 100 is provided with a roller 102 for engagement with the cam groove 87 of the disk 88 at a point substantially diametrically opposite from the roller 86. The ports in the several valve members and the cam grooves 87 and 95 are so shaped and arranged and the ratio of the several actuating gears is such as to obtain the necessary operating cycle hereinafter to be described.

Fixed to the rear shaft 33 is a main drive pinion 103 which meshes with and drives a gear 104 fixed to a stud shaft 105 journalled in bearings 106 and 107 carried by the wall 37 of the cam housing 38 and the wall 43 of the gear housing 42. This idler gear meshes with a gear 108 fixed to a stud shaft 109 journalled in bearings 110 and 111 carried by said walls and also with a pinion 112 fixed to a stud shaft 113 journalled in bearings 114 and 115 also provided on the walls 37 and 43. The shafts 33, 105, 109 and 113 extend through the end wall 43 of the gear housing and one may be employed as a main drive shaft while the others utilized to drive various auxiliary devices such as magnetos, and pumps for the lubricating and cooling systems.

In operation, let it be assumed that the parts occupy the positions shown in Fig. 4 in which a charge of combustible mixture has been compressed in the firing chamber 26 by the piston-vane A, the vane B has drawn a new charge of combustible mixture into the chamber 29 back of this vane, and the waste hot gases of a previously combusted charge is being scavenged from the chamber 29 ahead of the vane B through the exhaust port 60. Let it also be assumed that at this point in the cycle the compressed charge is fired in chamber 26, which at this instant is closed to the chamber 29 by both of the valves 63 and 64. The rotation of the rotor 28 caused by a previous combustion will carry the vane A to the position shown in Fig. 5 in which the gearing previously described will have rocked the valve 63 to the position indicated, in which communication is established between the firing chamber 26 and the combustion chamber 29. The expanding gases flowing into the chamber 29 will exert an impelling force back of the vane A sufficient to drive it around in a clock-wise direction, carrying the new charge around ahead of it and causing the vane B to complete its scavenging operation. It will be observed that, as the vane A moves through the chamber 29 it also moves radially outwardly to maintain contact with the wall of the chamber and as it does so it increases in surface area, thus compensating for the loss in energy of the propelling gases, as shown in Fig. 6. In this position of the vanes, all of the exhaust gases have been expelled. By the time the piston-vanes A and B reach the vertical positions shown in Fig. 7, the fired charge has expended practically all of its energy and the valve member 64 has moved to a position in which the passage 68 registers with the port 60, thus permitting the compressed charge ahead of the piston A to be forced into the firing chamber 26. It will be noted that at this instant the valve 63 is still in a position in which communication is established between the firing chamber 26 and the combustion chamber 29 in the same manner common to all two cycle engines, but this condition is instantaneous and communication through the port 66 is interrupted before the charge being compressed in the firing chamber 26 can escape in the combustion chamber 29 as shown in Fig. 8. The compressed gases entering the chamber 26 scavenges the burned gases therefrom. At this instant, as also shown in this figure, the piston-vane A passes the high pressure exhaust port 61 and the valve 71 moves to a position in which communication is established through the passageway 72 therein, between the portion of the chamber 29 behind the vane A and the exhaust pipes 73, thus permitting the burned gases to be partially scavenged through this port by the succeeding piston-vane B. Continued rotation of the rotor carries the piston-vane B past the inlet 59 and into position to draw another charge of combustible mixture into the chamber 29 to the rear of the vane B, as shown in Fig. 9. As the piston-vanes A moves upwardly and the vane B moves downwardly the former completes the compression of the preceding charge in the firing chamber 26 and the latter continues to scavenge the exhaust gases ahead of it and to draw in the succeeding charge at its rear, as shown in Fig. 10. As the vane A passes the port 60 the valve 64 moves to a position in which communication between the chamber 29 and the firing chamber 26 is interrupted, thus trapping the compressed charge in the latter, and in which communication is established between the chamber 29 ahead of the vane B and the outer atmosphere through the low pressure exhaust port 69, as shown in Fig. 11. Immediately following this portion of the cycle the vane B passes the high pressure exhaust port 61 which closes and the remaining burned gases are expelled from the chamber 29 through the low pressure exhaust port. It should be mentioned at this time that the herein-described engine in its preferred form includes two power units, that is to say, a second cylinder casing, rotor, valves and valve operating cams similar to those hereinbefore described, will be provided between the end wall 37 of the cam housing 38 and the gear housing 42, but in view of the fact that these parts are identical in construction and operation to the mechanism described, they have been omitted from the drawings for the sake of clearness. This second power unit has a 180° phase displacement with respect to the power unit just described and one unit supplies the power for the other unit during the cycle of operations of such other unit shown in Figs. 8 to 11 where no firing or combustion takes place. In such construction the several valve members may be continuous or connected in end to end relation and operated by a single set of cams and gears, the ports in the valves being suitably offset circumferentially.

It will be understood that the above description and accompanying drawings comprehend only the general and preferred embodiment of the invention, and that various changes in the construction, proportion and arrangement of the parts may be made by those skilled in the art, without departing from the nature and scope of the invention as defined in the appended claims.

The invention described herein may be manufactured and/or used by or for the Government of the United States of America for governmental purposes without the payment of any royalties thereon or therefor.

Having thus set forth and disclosed the nature of this invention, what is claimed is:

1. A rotary internal combustion engine comprising a cylindrical casing; a cylindrical member of less diameter than said casing rotatably mounted in said casing in excentric tangent relation thereto to provide an expansion chamber therebetween, said casing having a fuel inlet port and an exhaust port communicating with said chamber on opposite sides of the line of tangency between said rotatable member and said casing; vanes slidably mounted in said rotatable member for sealing contact with the wall of said expansion chamber; a firing chamber in said casing and communicating with said expansion chamber on opposite sides of said line of tangency; a valve for controlling communication between said fuel inlet port and said expansion chamber and between said firing chamber and said expansion chamber; a valve for controlling communication between said exhaust port and said expansion chamber and between said firing chamber and said expansion chamber; and means driven by said rotatable member for actuting said valves in timed relation to one another.

2. A rotary internal combustion engine comprising a cylindrical casing; a cylindrical member of less diameter than said casing rotatably mounted in said casing in excentric tangent relation thereto to provide an expansion chamber therebetween, said casing having a fuel inlet port and a low pressure exhaust port communicating with said chamber on opposite sides of the line of tangency between said rotatable member and said casing and a high pressure exhaust port communicating with said expansion chamber between said ports; vanes slidably mounted in said rotatable member for sealing contact with the wall of said expansion chamber; a valve for controlling communication between said fuel inlet port and said expansion chamber; a valve for controlling communication between said low pressure exhaust port and said expansion chamber; a valve for controlling communication between said expansion chamber and said high pressure exhaust port; and means driven by said rotatable member for actuating said valves in timed relation to one another, said expansion chamber increasing in cross-sectional area from said fuel inlet port toward said high pressure exhaust port and decreasing in cross-sectional area from said high pressure exhaust port toward said low pressure exhaust port, whereby the area of said vanes acted upon by the expanding gases increases as the pressure of said gases decreases.

3. A rotary internal combustion engine comprising a cylindrical casing; a cylindrical member of less diameter than said casing rotatably mounted in said casing in excentric tangent relation thereto to provide an expansion chamber therebetween, said casing having a fuel inlet port and a low pressure exhaust port communicating with said chamber on opposite sides of the line of tangency between said rotatable member and said casing and a high pressure exhaust port communicating with said expansion chamber between said ports; vanes slidably mounted in said rotatable member for sealing contact with the wall of said expansion chamber; a firing chamber in said casing and communicating with said expansion chamber on opposite sides of said line of tangency; a valve for controlling communication between said fuel inlet port and said expansion chamber and between said firing chamber and said expansion chamber; a valve for controlling communication between said low pressure exhaust port and said expansion chamber and between said firing chamber and said expansion chamber; a valve for controlling communication between said expansion chamber and said high pressure exhaust port; and means driven by said rotatable member for actuating said valves in timed relation to one another, said expansion chamber increasing in cross-sectional area from said fuel inlet port toward said high pressure exhaust port and decreasing in cross-sectional area from said high pressure exhaust port toward said low pressure exhaust port, whereby the area of said vanes acted upon by the expanding gases increases as the impelling force of said gases decreases.

DELMER S. FAHRNEY.